Patented Feb. 9, 1932

1,844,392

UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

OXIDATION OF ACENAPHTHENE

No Drawing.   Application filed September 11, 1928.   Serial No. 305,323.

This invention relates to the catalytic oxidation of acenaphthene substances, preferably in the vapor phase.

It has been proposed to oxidize acenaphthene catalytically in the vapor phase in the presence of metal oxide catalysts. This process has never been of commercial value as the yields are low and the product is of poor quality and difficult to purify. I have found that it is possible to oxidize acenaphthene, and its halogen derivatives catalytically in the vapor phase with great success using catalysts which contain stabilizers, that is to say compounds of the alkali forming metals, which appear to stabilize the reaction and permit obtaining of higher yields of the desired products with a minimum of undesired impurities. Even metal oxide catalysts when associated with stabilizers give better results than when not so associated, but I prefer to use contact masses containing salts of catalytically effective elements, or, as more particularly described below, complex compounds such as base exchange bodies and their derivatives. In addition to the presence of stabilizers it is frequently advantageous to incorporate other catalytically active components, which, however, are not specific catalysts for the oxidation of acenaphthene substances. These solid, chemical, non-specific, vapor phase catalytically active components are termed "stabilizer promoters" as they appear to promote or enhance the stabilizing action of the stabilizers. The invention, however, is in no sense intended to be limited to any theory of action of these non-specific catalysts. The oxidation of organic compounds generally by means of stabilized catalysts, with or without stabilizer promoters, is described and claimed in my prior Patent No. 1,709,853 dated April 23, 1929, of which the present application is in part a continuation. It should be understood that any of the stabilized contact masses described in the above referred to application as suitable for the oxidation of acenaphthene substances or as suitable for the oxidation of anthracene to anthraquinone or toluol to benzoic acid may be used in the present invention.

While the most various types of stabilized contact masses give satisfactory results in the present invention, I have found that the stabilized contact masses which contain base exchange bodies, either silicious or non-silicious, or their derivatives such as salt-like bodies or leached base exchange bodies are particularly effective, both by reason of the high molecular weight of the complex molecules involved, which distribute in a most desirably homogenous manner the catalytically effective radicals or atoms and by the physical characteristics of high porosity and surface energy, excellent resistance to high temperatures encountered in the catalysis, etc., which render these contact masses particularly effective in the present invention. These base exchange contact masses, or those containing derivatives, are described and claimed for the oxidation of organic compounds generally in my prior Patents No. 1,694,122 dated December 4, 1928, No. 1,735,763 dated November 12, 1929 and No. 1,722,297 dated July 30, 1929 and copending application Serial No. 294,597, filed July 21, 1928, of which the present application is in part a continuation. Any of the contact masses described in the above referred to applications as suitable for the oxidation of acenaphthene substances or for the oxidation of anthracene to anthraquinone or toluol to benzoic acid may be used in the present invention. Throughout the specification and in the claims the term "permutogenetic" covers base exchange bodies, silicious or non-silicious, the products obtained by the acid leaching of these base exchange bodies and the salt-like bodies obtained by the reaction of these base exchange bodies with compounds the acid radicals of which are capable of reacting with the base exchange bodies to produce products which show most of the properties of salt. When used in the claims, the term "permutogenetic" will have no other meaning. The contact masses referred to above can be used in the present invention to oxidize acenaphthene to acenaphthylene or acenaphthene substances to the various oxidation products such as acenaphthaquinone, bisacenaphthylidenedione, naphthaldehydic acid, naphthalic anhydride, hemimellitic acid, and in some cases maleic acid. The particular product obtained will vary, of course, with the contact mass used and with the reaction conditions. Normally, however, naphthalic anhydride is most easily obtained and appears to be the most stable of the oxidation products, and it is almost always present in the final product. Under suitable conditions, however, the other oxidation products may be obtained in smaller or larger quantities, or if desired naphthalic anhydride may be produced practically uncontaminated from the other oxidation products. In general the higher the amount of stabilizers and the less drastic the oxidation conditions, that is to say concentration of oxygen, temperature, amounts of diluent gases, contact time, etc., the greater the amount of oxidation products other than naphthalic anhydride.

While the present invention can be carried out using air as an oxidizing gas or other gases containing oxygen such as mixtures of carbon dioxide and oxygen and the like it is advantageous in many cases to carry out the oxidation in the presence of steam, which appears to exert a favorable influence on the reaction. It should, therefore, be understood that the present invention may be carried out with or without the presence of steam. The use of steam in the oxidation of acenaphthene substances is, however, not claimed broadly in the present invention but forms the subject matter of my co-pending application, Serial No. 304,615, filed September 7, 1928.

The invention will be illustrated in greater detail in connection with the following specific examples, which illustrate a few typical embodiments of the invention without, however limiting its scope with the precise details therein set forth.

*Example 1*

8–12 mesh quartz fragments are boiled in caustic potash until they are no longer transparent and their surfaces are thoroughly etched. The caustic potash is then washed off, first with water and then with dilute hydrochloric acid. The etched fragments are then placed in a revolving container and heated to a temperature well above the boiling point of water, and sprayed with an ammonium vanadate solution. The temperature of the fragments should be sufficiently high so that the water in the ammonium vanadate solution is evaporated immediately on striking the fragments, which are constantly tumbled by the revolving of the container. In this manner a uniform coating of ammonium vanadate is obtained on the fragments. The coated fragments are then placed in a tubular converter and calcined with air at about 400° C., transforming the ammonium vanadate into vanadium pentoxide. After calcination, 80–90% acenaphthene is vaporized into an air stream, with or without steam, and the vapors passed over the contact mass at a temperature of about 380–410° C. Good yields of naphthalic anhydride of high purity are obtained, and if a considerable amount of steam is used the naphthalic anhydride can be precipitated at about 140–150° C. in the form of the acid in a very high state of purity, the by-products being volatile at this temperature and being removed from the naphthalic acid.

Instead of using acenaphthene the same results can be obtained with acenaphthylene, or halogen derivatives of acenaphthene or acenaphthylene, the corresponding substituted naphthalic anhydrides being obtained.

*Example 2*

15 parts of silver vanadate are dissolved in 25 parts of ammonia water to form a solution of a complex salt, to which is added 25 parts of potassium sulfate or 29 parts of potassium bisulfate in the form of 25% aqueous solution. The solution is then sprayed onto 200 volumes of pumice or quartz fragments, as described in the foregoing example. The fragments are placed in a suitable converter, calcined with air at about 400° C., and then acenaphthene or acenaphthylene is vaporized, with or without steam, and passed over the contact mass at 330–380° C. Good yields of naphthalic anhydride are obtained, together with considerable amounts of the lower oxidation products when the lower temperatures are used.

Instead of using quartz or pumice fragments, etched granules of ferrous alloys, such as ferrosilicon, ferromolybdenum, ferrovanadium, ferrochrome or silico-ferromanganese may be used.

*Example 3*

The following mixtures are prepared:

(1) 280 parts of pumice meal or asbestos fibers are impregnated with about 2% of cobalt in the form of the nitrate dissolved in sufficient water to permit impregnation to form a moist mass. The impregnated pumice is then stirred into a waterglass solution of about 33° Bé. containing 4–5 mols of $SiO_2$, which solution has been previously diluted with about 5–6 volumes of water.

(2) .5 mol of $V_2O_5$ is dissolved in sodium hydroxide to form a normal solution which is almost neutral to litmus. About .7 mol of iron in the form of ferrous sulfate in moderately dilute aqueous solution is then added and iron vanadate mixed with iron oxide is precipitated.

(3) 1 mol of $V_2O_5$ is treated with 2% of its weight of concentrated sulfuric acid and diluted with 20 parts by weight of water. The mixture is boiled gently and gaseous $SO_2$ is passed through the acidified vanadic acid suspension until a clear blue solution of the vanadyl sulfate is formed. The blue solution is then gradually treated with 10 N. caustic soda until the precipitate of vanadyl hydroxide which forms at first dissolves in the caustic soda to form a coffee brown sodium vanadite solution.

The suspensions (1) and (2) are then poured together and at once the solution (3) is permitted to flow in in a thin stream with vigorous agitation. Most of the excess alkali is neutralized with 10% sulfuric acid and the gel which forms is well pressed, washed two or three times with 300 parts of water and dried at temperature of 100° C. The product is a zeolite body containing tetravalent vanadium diluted with impregnated pumice meal or asbestos fibers and iron vanadate.

The product is cautiously treated with 3–5% hydrochloric, sulfuric or phosphoric acid so as not to destroy the zeolitic structure of the body and dried, preferably under 100° C. A salt-like body results. The catalyst is then dehydrated by blowing air over it and gradually permitting the temperature to rise to 450° C.

Acenaphthene or halogen acenaphthenes or acenaphthylene, is vaporized into a stream of air, with or without steam, and the mixture is passed over the contact mass at 330–420° C. Good yields of naphthalic anhydride are obtained, the product being comparatively free from products of lower oxidation when the higher temperatures are use. The proportion of acenaphthene substances to air may be varied within wide limits without seriously affecting the yield.

*Example 4*

A vanadyl base exchange body is prepared by suspending 20 parts of $V_2O_5$ in 500 parts of water, adding a little concentrated sulfuric acid and then reducing the $V_2O_5$ with gases containing sulfur dioxide at the boiling point until it is completely transformed into blue vanadyl sulfate. The vanadyl sulfate solution is then divided into two parts, half of which is treated at 50–60° C. with sufficient 5 N. KOH to form a clear coffee brown solution of potassium vanadite, to which 50 parts of "Celite" earth is added as a diluent. The second half of the original solution is then added with vigorous agitation, care being taken that the alkalinity remains between phenolphthalein red and litmus blue. The gelatinous product is sucked but not dried and constitutes a vanadyl base exchange body.

10.2 parts of freshly precipitated aluminum oxide are brought into solution with 40 parts of 100% KOH in 200 parts of water. The vanadyl base exchange body described above is then stirred into the solution and a 10% aqueous solution containing 37 parts of ferric sulfate with 9 mols of water or 44.4 parts of aluminum sulfate with 16 mols of water or a mixture of the two, is added to the aluminate mixture with vigorous agitation. The reaction product produced, which is an aluminum iron base exchange body and which does not possess effective catalytic properties for the catalytic oxidation of most organic compounds, is diluted with the catalytically active vanadyl base exchange body and is thereby transformed into a highly active catalyst for the above referred to processes. The reaction product is sucked, pressed, washed with 300–400 parts of water, dried and broken into fragments. The fragments may be treated with 5% copper sulfate, silver nitrate, cobalt nitrate or iron nitrate solutions to partly replace the alkali with these metals. The product may also be treated with salts of the metal oxygen acids of the fifth and sixth groups, preferably with a 1% ammonium vanadate solution, resulting in a so-called salt-like body after the soluble components have been washed out.

The products are calcined with air or gases containing carbon dioxide at 400° C., the calcination temperature being permitted to rise gradually in order to prevent undesirable changes in the structure of the base exchange body. After this preliminary calcination the product may be preferably treated with 3–5% burner gases at 450° C. and is then ready for use.

Acenaphthene of various grades of purity or acenaphthylene is vaporized into an air stream, with or without the presence of steam, and passed over the contact mass at 350–420° C. Excellent yields of naphthalic anhydride of a high degree of purity are obtained, and at the lower temperatures the lower oxidation products are also obtained in smaller or larger quantities depending on the reaction conditions.

In this example the aluminum iron base exchange body may be considered as a complex stabilizer for the catalyst in these reactions. In order to promote or tune the stabilizing action of the catalyst various stabilizer promoters can be added in the form of silicates or heavy metal oxides such as ferric oxide, copper oxide, titanium dioxide, manganese dioxide, zirconium dioxide, cerium dioxide, beryllium oxide, calcium oxide, cobalt oxide or thorium dioxide. They may be added singly or in mixtures and may advantageously be formed in a nascent state. The amount of the stabilizer promoter added depends on the effect desired; in general, from 2-5% of such stabilizer promoters gives good results. These stabilizer promoters, of course, may be added in the same manner as any other diluent.

A different method of introducing the stabilizer promoters consists in replacing part or all of the metal salt components of the base exchange body with corresponding amounts of beryllium sulfate, silver nitrate, nickel sulfate, cadmium sulfate or similar mineral acid salts of these bases.

In many cases it is desirable to neutralize excess alkali in the reaction products with 5% mineral acid such as hydrochloric acid, sulfuric acid, nitric acid or the like until the alkalinity has been brought to the desired point. Other catalytically active base exchange bodies, of course, may be introduced as diluents instead of the one described.

*Example 5*

Three mixtures are prepared as follows:

(1) 210 to 250 parts of potassium or sodium waterglass solution of 33° Bé. diluted with 15 to 20 volumes of water are mixed with kieselguhr or other material rich in $SiO_2$ such as glaucosil, the acid treated residue of greensand, until a suspension is obtained which is just stirrable.

(2) 18 parts of $V_2O_5$ are dissolved in just sufficient 10-20% caustic potash or caustic soda solution so that potassium or sodium vanadate is obtained.

(3) 18 parts of $V_2O_5$ are reduced with sulfur dioxide in aqueous suspension in the usual way to form the blue vanadyl sulfate, about 200 to 300 parts of water being needed. The excess $SO_2$ is removed by boiling.

Mixtures (1) and (2) are poured together and solution (3) is permitted to flow in with vigorous agitation, care being taken that the reaction mixture remains at least alkaline to litmus. The alkalinity can be adjusted by slight additions of N. potassium hydroxide solution, if necessary. A dirty gray-blue gel results which is filtered with suction, washed with a little water and then dried and constitutes a three component base exchange body containing tetravalent and pentavalent vanadium in non-exchangeable form and having materials rich in $SiO_2$ finely distributed throughout its framework.

The contact mass is then subjected to the action of 3-6% solutions of iron or manganese salts in order to introduce one or both of these elements by base exchange. The mass is then calcined, and acenaphthene of various grades of purity or acenaphthylene is vaporized into a stream of air, with or without the presence of steam, and passed over the contact mass at temperatures between 380 and 450° C. Good yields of naphthalic anhydride, together with some hemimellitic acid, are obtained, the products being of excellent purity.

A further modified method of preparing highly efficient contact masses consists in introducing in the diluents, before use, vanadates, molybdates, tungstates, chromates or tantalates, especially of the heavy metals. For this purpose the diluents may be impregnated with 3 to 5% of such metallates in the usual way.

*Example 6*

The following three mixtures are prepared:—

(1) 280 parts of pumice meal or asbestos fibers are impregnated with a manganese nitrate solution containing 1% of manganese and being sufficiently dilute to permit proper impregnation of the material. Thereupon the product is washed with a 10% ammonia solution and then with water in order to remove the ammonia. The impregnated pumice is stirred into a waterglass solution of about 33° Bé. containing 24-30 parts of $SiO_2$ diluted with 5-6 volumes of water.

(2) 9.1 parts of $V_2O_5$ are dissolved in sufficient normal sodium hydroxide solution so that the product is almost neutral to litmus. About 19.5 parts of $FeSO_4$ plus $7H_2O$ in the form of a fairly dilute water solution is added and a precipitate of iron vanadate admixed with iron oxide is obtained.

(3) 18.2 parts of $V_2O_5$ are treated with 2% of their weight of concentrated sulfuric acid and diluted with 200 parts of water. The mixture is gently boiled and gaseous $SO_2$ passed through until a clear blue solution of the vanadyl sulfate is obtained. The blue solution is gradually treated with 10 N. caustic soda until the precipitate of vanadium hydroxide which forms at first dissolves in the caustic soda to form a coffee brown sodium vanadite solution.

Suspensions (1) and (2) are then poured together and immediately solution (3) is introduced in a thin stream with vigorous agitation. Most of the excess alkali is neutralized with 10% sulfuric acid and the gel which forms is well pressed, washed two or three times with 300 parts of water and dried at temperatures of about 100° C. The product is a zeolite containing tetravalent vanadium diluted with the impregnated pumice meal or asbestos fibers and iron vanadate. The product is cautiously leached with 2-3% hydrochloric or sulfuric acid in order to remove the exchangeable alkali, then washed to free it from acid and dried, preferably under 100° C. The leached base exchange body obtained is pressed into suitable granules and is then an effective catalyst for the catalytic oxidation of acenaphthene substances in the presence of steam under the usual reaction conditions.

An even more effective contact mass can be obtained by pulverizing the leached base exchange body and suspending it in a solution of a cementing agent, such as potassium sulfate, bisulfate or acid phosphate, which solution may advantageously contain from 10–15% of the cementing agent together with sufficient water to form a good suspension. The suspension is then sprayed onto fragments of pumice or roughened quartz fragments to produce a uniform and effective coating. The contact mass, either in the form of granules or coated onto fragments, is calcined with air at about 450° C. and is well suited for the vapor phase oxidation of acenaphthene or its halogen derivatives to the corresponding naphthalic anhydrides. The vapors of the aromatic compounds in question, preferably having a purity of about 90%, are mixed with air and steam in the proportion of 1:18 by weight and passed over the contact mass at 360–420° C. Excellent yields of the desired product are obtained and impurities, such as carbazole and phenanthrene in the case of anthracene, are completely burned out. The proportion of aromatic hydrocarbons to air can be varied within fairly wide limits without seriously affecting the yield.

Instead of preparing a two-component zeolite by the reaction of a vanadite with waterglass, zeolites can be prepared by the reaction of sodium or potassium vanadate with waterglass under the conditions described above and when leached result in excellent catalysts.

Instead of using metallate solutions, such as vanadites and vanadates referred to above, metal salt solutions can be used in which the metal bases are sufficiently amphoteric, thus for example the corresponding zeolites can be prepared by the interaction of vanadyl sulfate and waterglass, the amounts of the components being so chosen as to produce a reaction product which is alkaline to litmus or preferably alkaline or neutral to phenolphthalein.

Corresponding three-component zeolites may also be prepared by bringing about the interaction of waterglass with potassium or sodium vanadite and vanadyl sulfate, the vanadite solution being first mixed with the waterglass solution and then the vanadyl sulfate added with vigorous agitation until the gel-like reaction product remains alkaline to litmus, or preferably alkaline or neutral to phenolphthalein.

The leaching of the dried diluted zeolites described above can be effected by hydrating in the usual manner and then permitting dilute organic or inorganic acids to trickle over the zeolite until part or all of the exchangeable alkali is leached out. Instead of using quartz or pumice fragments as carriers, suspensions of the leached zeolites may be coated onto coarse natural or artificial granules of diatomaceous earth, filter stones, silicates, rocks, certain minerals, etc. using waterglass or alkali metal compounds as cementing agents.

Instead of coating the ground leached zeolites onto fragments, they may be mixed with waterglass solutions or alkali metal compounds and then formed into suitable pellets having the proper shape for use in converters for the catalytic oxidation of organic compounds, for example tubular bath converters.

Instead of directly leaching the base exchange bodies, they may first be hydrated and then treated with salt solutions in order to exchange part or all of the exchangeable alkali for bases of the solutions. Thus, for example, 5–10% solutions of copper sulfate, ferric chloride, cobalt nitrate, nickel nitrate, manganese nitrate, etc. singly or in admixture, are permitted to trickle over the base exchange body until no further base exchange takes place.

*Example 7*

100 parts of an ordinary artificial zeolite containing sodium and aluminum prepared either by fusion or wet methods or similar amounts of a natural zeolite are repeatedly digested with a 5% lead nitrate solution introducing lead into the zeolite by base exchange. The adhering lead nitrate solution is then removed by washing and the product treated with a 10% potassium vanadate solution until the vanadate of the lead zeolite is formed (i. e. a salt-like body). The excess vanadate is then thoroughly washed out, the product first dried at temperatures under 100° C. in a stream of air followed by calcination at 400° C.

A mixture of acenaphthene vapors and air, with or without steam, in the proportion of 1:14 is passed over the catalyst at 300–450° C. and excellent yields of acenaphthylene is produced.

*Example 8*

14 parts of molybdic oxide in the form of potassium molybdate are dissolved in 400 parts of water, and 60 parts of kieselguhr are poured in. The molybdic oxide is then precipitated in a fine state of division into the kieselguhr by adding a sufficient amount of 10% sulfuric acid. To the suspension is then added a mixture of 140 parts of a 33° Bé. potassium waterglass solution diluted with 300 parts of water and 10 parts of copper nitrate in the form of a 10% cuprammonium nitrate solution. 10% sulfuric acid is then added until the whole mass solidifies to a gel, which is washed, dried and then impregnated with 5% nitric acid to destroy the alkalinity, forming the nitrate of a cuprammonium zeolite, a so-called salt-like body. After this treatment the contact mass is filled into a suitable converter and calcined at 400° C. Thereupon vapors of acenaphthene or acenaphthylene mixed with air, with or without steam, in the proportion of about 1:30 are passed over the contact mass at 380–450° C. Good yields of naphthalic anhydride of a very satisfactory grade of purity are obtained. At the lower temperatures considerable amounts of lower oxidation products are also obtained, which can be separated from the naphthalic anhydride and recovered. When operating to produce other lower oxidation products as well as naphthalic anhydride it is desirable to utilize steam, as this prevents polymerization of acenaphthene and aids in the separation of the lower oxidation products from naphthalic anhydride.

*Example 9*

A natural or artificial zeolite such as those available commercially for water softening purposes is digested with solutions of potassium, rubidium, lithium or caesium chlorides in order to replace the sodium by base exchange. The zeolite is then dried and 250 volumes are sprayed with a 2–3% ammonium vanadate or ammonium molybdate solution, or a mixture of the two, the fragments being agitated and maintained at a sufficiently elevated temperature to assure thorough impregnation. Then the impregnated zeolite is treated with a 5% solution of equal parts of ferrous chloride and ferrous sulfate in order to form a precipitate of iron vanadate or iron molybdate, as the case may be, in the zeolite. When precipitation is completed the product is placed in a converter and calcined at 400–450° C. in a stream of air, followed by treatment at the same temperature with a mixture of air and 5–7% $SO_2$, a contact sulfuric acid process beginning. Then the acid vapors are blown out with hot air until they are no longer noticeable, and the contact mass is ready for use. Vapors of acenaphthene or other acenaphthene substances admixed with air in the proportion of 1:10 to 1:30 by weight are passed over the contact mass at 360–420° C. Naphthalic anhydride together with some hemimellitic acid is obtained. If desired the reaction may take place in the presence of steam, for example by using a moist air which has been bubbled through hot water.

*Example 10*

60 parts of kieselguhr are mixed with a solution containing 12 parts of potassium vanado-molybdate in 60 parts of water and mixed with a suspension containing 6 parts of ferric pyrovanadate in suspension. 8 parts of KOH in 25 parts of water are then added and the mass produced is formed into granules, dried, calcined at 400° C., and then subjected to a subsequent treatment of burner gases at 400–500° C., until all the alkali is transformed into the sulfate or bisulfate. The contact mass is then blown with air until acid gases no longer escape, and is then suited as a contact mass for the catalytic oxidation of acenaphthene substances to naphthalic anhydrides under the reaction conditions described in the foregoing example.

*Example 11*

50 parts of colloidal silicic acid and 60 parts of comminuted pumice are thoroughly mixed and treated with 25 parts of freshly precipitated ferric vanadate, 5 parts of potassium sulfate, 2 parts of potassium chlorate, 2 parts of lithium carbonate and one part of potassium cyanide dissolved or suspended in 80 parts of water. The ferric vanadate may advantageously contain 10 per cent excess of ferric oxide. The mass is formed into granules, dried and calcined at a temperature of 400° C., and forms a catalyst which can be effectively used for the catalytic oxidation of acenaphthene to naphthalic anhydride when the vapors of the hydrocarbon mixed with a great excess of air are passed over the contact mass at 330–400° C.

After the catalyst has become spent from use it can be readily reactivated by means of oxides of nitrogen or by spraying with dilute nitric acid.

*Example 12*

280 parts of pumice meal or comminuted asbestos fibers are treated with 2 per cent of its weight of manganese sulfate containing 2 mols of water which is introduced in the form of a 10% aqueous solution. A 10% solution of caustic alkali is then added, precipitating the manganese oxide in a finely divided condition. The impregnated pumice is then stirred into a 33° Bé. water-glass solution containing about 24 to 30 parts of $SiO_2$, the solution having been previously diluted with about 5 to 6 volumes of water. 9 parts of $V_2O_5$ are dissolved in a normal sodium hydroxide solution to form a sodium vanadate solution containing sufficient sodium hydroxide to cause the solution to react strongly alkaline to litmus. To this solution 16 parts of $Fe_2O_3$ in the form of a 10 per cent ferric sulfate solution are added to precipitate ferric vanadate mixed with ferric oxide.

18 parts of $V_2O_5$ are mixed with 2 per cent of their weight of concentrated sulfuric acid and then diluted with 20 parts by weight of water. The suspension is boiled quietly and $SO_2$ containing gases are passed in until a clear blue solution of canadyl sulfate is formed. The blue solution is then gradually treated with 10 N sodium hydroxide solution, which first precipitates out vanadyl hydroxide and then dissolves up the precipitate to form a clear coffee-brown solution of sodium vanadite. The waterglass suspension and the ferric vanadate-ferric oxide $MnO_2$ suspensions are poured together and the vanadite solution added with vigorous agitation. The major part of the excess alkali is neutralized with 10 per cent sulfuric acid or 5 per cent nitric acid, or a mixture of both, and the gelatinous product formed is pressed, washed two or three times with 200 parts of water and dried at temperatures below 100° C. The product is a zeolite-like sodium-vanadyl polysilicate diluted with pumice meal or asbestos fibres and containing ferric vanadate, ferric oxide and manganese oxide in a fine state of subdivision. The stabilizer in this product is present in the form of a complex compound. $Fe_2O_3$ and $MnO_2$ act as stabilizer promoters.

The contact mass described is well suited for the oxidation of acenaphthene and chloracenaphthene to naphthalic anhydride and chlornaphthalic anhydride, the vapors of the aromatic compounds mixed with air in the proportion of 1 to 30 by weight being passed over the contact mass at 330–420° C.

Example 13

80 parts of kieselguhr are suspended in 300 parts of water containing 20 parts of KOH and 18 parts of $V_2O_5$. Thereupon 160 parts of 33° Bé. potassium water-glass solution diluted with 3 to 4 volumes of water is added and sufficient 10 per cent solution of equal parts ferric sulphate and manganese sulfate is added until the mother liquor of the diluted reaction produce is neutral or acid to congo. An iron manganese polysilicate is thus produced which contains iron manganese vanadate in finely divided state. The product is freed from the mother liquor by pressing, but is not washed, in order to prevent washing out the potassium sulfate which is present and which acts as a stabilizer. The product is dried, broken into fragments and calcined, and is a good catalyst for the oxidation of acenaphthene to naphthalic anhydride under the reaction conditions described in some of the foregoing examples.

Example 14

15 parts of $V_2O_5$ are dissolved in N/2 KOH solution in the form of potassium metavanadate. 5 parts of freshly precipitated aluminum oxide are dissolved up in 35 to 40 parts of 100% KOH dissolved in 250 parts of water forming a potassium aluminate solution. The two solutions are poured together and a mixture of 20 parts $TiO_2$ and 50 parts of kieselguhr are stirred in. Thereupon 17 parts of aluminum sulfate with 18 mols of water mixed with 20 parts of ferric sulfate having 9 mols of water are dissolved in about 300 parts of water and the solution is then gradually poured into the aluminate-vanadate suspension at temperatures of about 50 to 70° C. 5% sulfuric acid is then gradually added until the desired alkalinity or neutrality to phenolphthalein is obtained.

The reaction product produced is a vanadium-aluminum-iron base exchange body which contains as a diluent titanium oxide and kieselguhr. The product is freed from the mother liquor in the usual manner, washed with 3 to 5 times its weight of water and then dried at temperatures below 100° C.

The product is then broken into fragments and filled into a converter. Acenaphthene is vaporized with air in the ratio of 1:15 to 1:30, with or without steam, and passed over the contact mass at 360–400° C. Very good yields of naphthalic anhydride are obtained.

In this contact mass composition part of the base exchange body components may be considered as stabilizers for the catalytically effective components and the titanium dioxide appears to act as a promoter for these stabilizers. The contact mass can also be treated with water after drying in order to hydrate it and then calcined before use.

Example 15

12 parts of $V_2O_5$ are suspended in 250 parts of water to form a slurry, acidified with 5 parts of concentrated sulfuric acid and then reduced to the blue vanadyl sulfate in the usual manner, for example, by means of gases containing $SO_2$ which are passed into the solution at the boiling point. 107 parts of waterglass solution at 33° Bé. are then diluted with 200 parts of water and about 60 parts of "Celite" stirred in. The waterglass solution is then poured into the vanadyl sulfate solution with vigorous agitation, precipitating out vanadyl silicate. Care should be taken that after all of the solutions have reacted the resulting mixture must be made neutral to litmus, if necessary with the help of small amounts of N. sulfuric acid. 10 parts of freshly precipitated aluminum oxide are treated with sufficient N/2 KOH solution to dissolve up the aluminum oxide in the form of potassium aluminate and to provide a 10% excess of KOH.

37 parts of $Fe_2(SO_4)_3$ 9 aq. are dissolved in 250 to 300 parts of water.

Instead of using this latter salt component for the formation of the base exchange body corresponding amounts of titanium sulfate, aluminum sulfate, copper nitrate, cobalt nitrate, nickel sulfate, thorium nitrate, silver nitrate, zirconium nitrate, cerium nitrate or a mixture of them, can be used.

The vanadyl silicate is then stirred into the aluminate solution diluted with "Celite" and thereupon the above mentioned salt component or components are added producing a base exchange body in which the vanadyl silicate is homogeneously incorporated as a diluent.

The reaction product is treated in the usual way by pressing and drying below 100° C. and is broken into fragments. After hydration by trickling water over the fragments the alkali of the base exchangeable part can be replaced by iron, using a 5% iron sulfate solution. Replacing the alkali of the base exchange by copper, silver, nickel and lead using a 5 to 10% solution of the corresponding salts or their mixtures, favorably influences the catalytic efficiency of such contact masses for the catalytic oxidation of organic compounds.

Treatment with ammonium vanadate or molybdate for the formation of the so-called salt-like body helps to enhance the catalytic efficiency for specific oxidation reactions and also the resistance of such contact masses against high temperatures often obtaining in these processes.

Contact masses containing such components are well suited for the catalytic oxidation of acenaphthene to acenaphthylene, acenapthaquinone, bisacenaphthylidenedione, naphthaldehydic acid, naphthalic anhydride and hemimellitic acid.

These organic compounds are mixed with air in the ratio of 1:35 by weight and are passed over the contact mass at 340 to 440° C.

Example 16

20 parts of 33° Bé. sodium waterglass solution are diluted with 15 to 20 volumes of water and 60 to 80 parts of infusorial earth are added. Sufficient 5% iron sulfate, copper sulfate, silver nitrate, calcium chloride, strontium chloride, and manganese nitrate solution, singly or in admixture, are added with vigorous agitation to bring about a neutral reaction to litmus. The precipitate is sucked and thoroughly washed with water to get the alkali metal salt out of it and then constitutes diluted neutral silicates of the metals used which can be further worked up without drying.

10 parts of $Al_2O_3$, freshly precipitated, are transformed into potassium aluminate using a sufficient amount of 2 N. KOH solution to provide an excess alkali amounting to about 10 to 15%. The diluted silicates described above are kneaded into this solution. 50 parts of $Al_2(SO_4)_3$ $18H_2O$ are dissolved in about 200 parts of water. The latter solution is then kneaded with the aluminate mixture and after addition of all the solution, an alkaline or neutral reaction of phenolphthalein should be obtained.

The diluted reaction product so obtained is freed from mother liquor by pressing, dried at temperatures under 100° C. and broken in pieces. The dried fragments are leached out by trickling water over them and then are treated with a 5% vanadyl sulfate solution, chromium nitrate solution or uranyl nitrate solution or a mixture of them, in order to exchange, as far as possible, the alkali for these radicals. Thereafter the product is impregnated with a dilute potassium or ammonium vanadate solution in order to form the so-called salt-like body, that is, the vanadate of the vanadyl base exchange body diluted with silicates and infusorial earth.

After drying and calcining, the contact mass so obtained is very efficient for the catalytic oxidation of acenaphthene to naphthalic anhydride when the vapors of the hydrocarbons, mixed with air in the ratio of 1:20 by weight, are passed over the catalyst at 340 to 420° C.

The silicates act in this contact mass as stabilizer promoters in the reaction and at the same time render the contact mass highly resistant to high temperatures often obtaining in such catalytic oxidation processes.

Instead of neutral silicates 5 to 10% of $TiO_2$, $Fe_2O_3$ or MnO, singly or in admixture, can be used, the amount depending on the diluent.

Example 17

Three solutions are prepared as follows:

(1) 210 parts of 33° Bé. potassium waterglass solution are diluted with 6-8 volumes of water and a mixture of comminuted silicates and kieselguhr is stirred in until the suspension just remains easily stirrable. The mixed diluent should preferably contain more than 25% of kieselguhr.

(2) 18 parts of $V_2O_5$ are reduced to a blue vanadyl sulfate solution in a hot aqueous solution acidified by sulfuric acid, sulfur dioxide being used as the reducing agent. The vanadyl-sulfate is transformed into a brown solution of potassium vanadite by means of sufficient 10 N. caustic potash solution.

(3) A 100% aluminum sulfate solution is prepared.

Suspension (1) and solution (2) are poured together and a sufficient aluminum sulfate solution is added in a thin stream with vigorous agitation to bring the reaction mixture to neutrality to phenolphthalein or to a point which is just on the alkaline side. The mass solidifies to a dirty green gel, is filtered with suction, slightly washed and dried and is a three-component zeolite containing tetravalent vanadium, aluminum and $SiO_2$ in the non-exchangeable form. If desired, the diluents may be suspended in solution (2) or may be stirred into a mixture of waterglass and aluminum. Part or all of the aluminum in solution (2) may be substituted by corresponding amounts of a potassium vanadate solution prepared by dissolving $V_2O_5$ in 2 N. potassium hydroxide. The vanadium may be partly or wholly replaced by other metallates.

Instead of using the aluminate solution in solution (3), it may be substituted partly or wholly by one or more other metal salt solutions, such as, for example, copper sulfate, nickel sulfate, cobalt sulfate, iron sulfate, manganese nitrate, ferric chloride, zinc sulfate, cadmium sulfate, titanium nitrate, thorium nitrate, zirconium nitrate, etc.

After drying the products, preferably at 100° C., they may be subjected to base exchange after hydrating or salt-like bodies can be formed. Thereupon they are leached with 2-4% hydrochloric acid and the leaching may be carried out as far as necessary, depending on the amount of alkali which it is desired to retain in the product. After leaching the material is formed into suitable pellets using a small amount of potassium waterglass as a cementing agent.

The contact masses which contain iron and aluminum in the non-exchangeable portion of the leached base exchange body or are present as diluents are suitable for the catalytic oxidation of acenaphthene to naphthalic anhydride and hemimellitic acid.

Example 18

18.2 parts of $V_2O_5$ are dissolved in 250 parts of potassium hydroxide solution containing 22.6 parts of KOH. 27 parts of ferric sulfate are dissolved in 300 parts of water at 50-60° C. and the potassium vanadate solution is then poured in with vigorous agitation. The yellow precipitate of ferric vanadate which forms is filtered by suction and washed with water until the filtrate is colorless. Thereupon the wet cake is sludged in 200 parts of water, and 35 parts of $K_2SO_4$ dissolved in 250 parts of water are added to the suspension, which is then sprayed onto 500 volumes of 8-12 mesh pumice fragments while the latter are heated and tumbled so that the water of the suspension evaporates immediately on coming into contact with the fragments.

Instead of using potassium sulfate as a stabilizer it may be replaced partly or entirely by one or more other compounds of alkali forming metals, such as $KNO_3$, $KNO_2$, $KHSO_4$, KCl, KBr, $CaSO_4$, $MgSO_4$, etc. Corresponding compounds of lithium, sodium, rubidium or caesium may also be used.

The amount of stabilizers added may be varied within wide limits and will depend on the products desired.

The contact mass is filled into a converter, for example a tubular converter, with a boiling metal bath as described in connection with some of the prior examples, and acenaphthene uniformly vaporized with air in the ratio of 1:25 by weight is passed over the contact mass at 380-410° C. Naphthalic anhydride of high purity is obtained in yields higher than 80% of the theory. At a somewhat lower temperature and with less air acenaphthylene, acenaphthaquinone and naphthaldehydic acid are obtained as the main products, and can be separated from the naphthalic anhydride by well known methods.

The reaction may also be carried out in the presence of steam, in which case a larger range of reaction temperatures and higher loadings are permissible. At 400° C. when using steam naphthalic anhydride of extremely high purity can be obtained.

Instead of using vanadium in the above contact mass other elements such as the metal elements of the fifth and sixth groups of the periodic system, for example molybdenum, tungsten, uranium, chromium, columbium and tantalum, may be used, singly or in admixture. Also, instead of using the iron salts these may be partly or wholly replaced by salts of one or more of the following elements:—cobalt, nickel, copper, silver, aluminum, titanium, zirconium, manganese or cerium.

Instead of using pumice fragments roughened quartz fragments may be used, or fragments of quartz filter stones, sand stones, "Celite" bricks, natural or artificial silicates, base exchange bodies, especially zeolites prepared by fusion methods, metal granules such as aluminum granules or granules of alloys such as ferrosilicon, ferrovanadium and the like.

Example 19

1,000 parts of natural base exchange bodies or a diluted or undiluted artificial base exchange body prepared by wet or fusion methods such as are available in the trade for water softening purposes are treated with 5-10% metal salt solutions such as ferric sulfate, cobalt nitrate, nickel sulfate, copper sulfate, silver nitrate, aluminum sulfate, manganese sulfate, vanadyl sulfate, chromium nitrate, etc., in order to exchange part of the exchangeable alkali. Base exchange may be effected by trickling the solutions over the base exchange bodies at 40-50° C. After base exchange has been effected the bodies are treated with water soluble compounds of the metal acids of the fifth and sixth groups of the periodic system, such as, for example, ammonium vanadate or ammonium molybdate solutions, in order to form the so-called salt-like bodies of the base exchange body. The product is then calcined at 400-500° C. with 7% $SO_2$ gases or gases containing a corresponding amount of $SO_3$.

Acenaphthene uniformly vaporized with air in various ratios such as, for example, 1:35 by weight, is passed over the contact mass at 370-420° C. Good yields of naphthalic anhydride of high purity are obtained. The reaction conditions, such as temperature, time of contact, loading, concentration of acenaphthene to oxygen and the like, may be varied within wide limits. It is also possible to vary the oxygen content of the oxidizing gases and diluent gases, and diluent gases such as carbon dioxide and nitrogen may be used or steam may be used as a diluent in greater or less amounts. Steam is of advantage in many cases, particularly when naphthalic anhydride is obtained accompanied by intermediate oxidation products, as in addition to smoothing out the reaction the separation of the products can be easily effected and chemically pure naphthalic anhydride can be fractionally condensed as the acid.

The reaction can be carried out in bath cooled tubular converters as has been described in conjunction with some of the foregoing examples, or, converters provided with automatic reaction gas cooling may be used, with or without recirculation of part of the reacted products.

*Example 20*

200 parts of 33° Bé. waterglass solution, diluted with 6–8 volumes of water, are mixed with kieselguhr or "Celite" brick refuse until the suspension just remains readily stirrable. 18 parts of $V_2O_5$ are reduced in a hot aqueous solution acidified with $H_2SO_4$ to a blue vanadyl sulfate by means of sulfur dioxide. The vanadyl sulfate obtained is then transformed into a brown solution of potassium vanadite by using sufficient 10 N. caustic potash. A 5–10% solution of a mixture of ferrous sulfate and manganese sulfate, in the ratio of 3:1, is also prepared. The vanadite and waterglass solutions are poured together, and then the iron-manganese sulfate solution is poured in a thin stream with vigorous agitation until the reaction mixture is neutral to phenolphthalein or is just alkaline. The mass solidifies to a dirty greenish gel which is filtered with suction, washed three times with 100 volumes of water, and dried.

Instead of suspending the diluent in the waterglass solution it may be suspended in the vanadite solution, or the vanadite and waterglass solutions may be mixed and the diluent then stirred in. It is also possible to substitute part or all of the vanadite solution by a corresponding amount of potassium vanadate solution prepared by dissolving $V_2O_5$ in potassium hydroxide solution. This component of the contact mass may also be partly or entirely replaced by one or more of the other metallates of the fifth and sixth groups of the periodic system, such as potassium tungstate. The iron-manganese salts may also be partly or wholly replaced by one or more of the salts of copper, nickel, cobalt, aluminum or other iron salts.

The products obtained, after drying at 100° C., may if desired be subjected to base exchange or to the formation of salt-like bodies. In such cases, of course, the base exchange body is first hydrated by trickling water over it. The exchangeable alkali may be partly replaced by one or more of the following elements:—iron, cobalt, silver, nickel or cerium, in the form of 5–10% salt solutions which are permitted to trickle over the base exchange body at room temperature or somewhat above.

These contact masses are alkaline in character and before use may preferably be treated with acid to render them neutral or acid. This may be easily effected by spraying the fragments with 10% sulfuric or nitric acid to an extent such that the alkalinity is neutralized, and when the product is leached or boiled with water no alkaline reaction can be noted.

Acenaphthene of various grades of purity is uniformly vaporized with air at from 1:20 to 1:30 and passed over the contact mass at 380–410° C. Naphthalic anhydride of high purity is obtained in good yields, and the impurities obtained in crude acenaphthene are entirely burned out or transformed into compounds, for example compounds of acid character such as phthalic anhydride and maleic acid, which can be easily separated from the naphthalic anhydride produced as they are soluble in water. Instead of spraying acid onto the base exchange bodies they may be placed on a nutsch filter and treated with ½ to 1½% acid solutions such as, for example, hydrochloric or sulfuric acid, or a weak acid such as acetic acid may be used. The leaching is carried out until a greater or smaller amount of the exchangeable alkali of the base exchange bodies is removed. The resulting products are used as described above.

*Example 21*

22 parts of aluminum sulfate with 18 mols of water are dissolved in 150 parts of water and the aluminum hydroxide is precipitated out with ammonia. The precipitate is washed with 150–200 parts of water. 12 parts of $V_2O_5$ are dissolved in 5 N. KOH, the solution being effected at about 80–90° C. The aluminum hydroxide cake is then stirred into the vanadate solution, forming a milky paste. 60 parts of "Celite" brick refuse are suspended in 250 parts of water to which 8 parts of ferric sulfate are added, and ferric hydroxide is precipitated out with ½ N. KOH and the cake is washed free from the mother liquor. The milky paste of aluminum hydroxide and potassium vanadate is then kneaded thoroughly with the impregnated "Celite" brick refuse, and the mixture is then incorporated in 25 parts of 33° Bé. potassium waterglass. The material is then put on a suction filter and washed with 100 parts of water, the cake is dried at a temperature below 100° C. and broken into suitable fragments. The fragments are then impregnated in installments with 10% $H_2SO_4$, drying between each impregnation in order to form the salt-like body of the zeolite.

Crude acenaphthene uniformly vaporized with air in the ratio of 1:25 by weight is passed over the contact mass at 370–450° C., and naphthalic anhydride is obtained in good yields with same hemimellitic acid, maleic acid and naphthaldehydic acid, which can be readily separated from the naphthalic an-

Example 22

14 parts of $V_2O_5$ are dissolved in potassium hydroxide to form potassium vanadate, using 200 parts of water. 9.5 parts of sodium tungstate are dissolved in 35 parts of water, and the two solutions are mixed whereupon hydrochloric acid is added until the solution is slightly alkaline to litmus. Thereupon it is diluted with 600–700 parts of water, and 70–75 parts of commercial waterglass solution diluted with the same amount of water are added with vigorous agitation, the mixture being heated up to 60–70° C. and diluted hydrochloric acid added in small portions from time to time, care being taken that the reaction mixture remains distinctly alkaline to litmus at all times. A gelatinous precipitate is obtained, which is pressed free from the mother liquor, dried and then hydrated with water in the usual way. A 5% manganese chloride solution is then trickled over the product in order to replace part of the alkali by manganese oxide. This base exchange is followed by treatment with diluted nitric acid.

Different grades of acenaphthene vaporized in an air stream in various ratios are passed over the contact mass at 320–400° C. Oxidation products such as acenaphthaquinone, bisacenaphthylidenedione, naphthaldehydic acid, napthalic anhydride, hemimellitic acid and maleic acid are obtained in various proportions. When gases of lower oxygen content and lower temperatures are used the oxidation products lower than naphthalic anhydride are obtained in better yields, but some naphthalic anhydride is practically always present. Where it is desired to obtain primarily acenaphthaquinone and bisacenaphthylidenedione it is not necessary to neutralize the alkalinity of the contact mass by the formation of the so-called salt-like body.

Example 23

18 parts of $V_2O_5$ are suspended in 200 parts of water acidulated with concentrated sulfuric acid and are then reduced to the vanadyl sulfate in the usual manner, for example with sulfur dioxide. The solution is boiled and concentrated to 150 parts. 10 parts of aluminum oxide in the form of the freshly precipitated hydroxide are transformed into potassium aluminate with 5 N. potassium hydroxide solution. ⅓ of the vanadyl sulfate is treated with 10 N. potassium hydroxide solution to transform it into the brown vanadite and is then mixed with the potassium aluminate solution, and 100 parts of infusorial earth are stirred in. Thereupon the remaining ⅔ of the vanadyl sulfate is added with vigorous agitation, the product is pressed, dried, broken into fragments and hydrated for a considerable period of time with water, after which it is digested with 5% copper sulfate in order to replace part of the exchangeable alkali with copper. The product is then broken into suitable pieces, and calcined at 450° C. with 3–4% burner gases.

90% acenaphthene uniformly vaporized with air in the ratio of 1:25 by weight is passed over the contact mass at 360–400° C., naphthalic anhydride of high purity being obtained.

Example 24

21.5 parts of ferric chloride are dissolved in 300 parts of water and 80 parts of infusorial earth are stirred in. The suspension is then heated to about 40–50° C., and potassium vanadate solution containing 18.1 parts of $V_2O_5$ and 22.6 parts of KOH in 250 parts of water is added with vigorous agitation. The ferric vanadate is uniformly precipitated throughout the infusorial earth and the cake is then filtered free from the mother liquor and washed with 250 parts of cold water. 90.5 parts of 33° Bé. waterglass solution is diluted with 4–5 volumes of water, and the filter cake containing the impregnated infusorial earth is stirred in vigorously to effect uniform distribution. 60 parts of aluminum sulfate with 18 mols of water are dissolved in 200 parts of water and transformed into potassium aluminate by means of 10 N. potassium hydroxide solution. The aluminate solution is then poured into the suspension and the mixture heated to about 60° C., a gelatinous precipitate coming down almost at once which is increased by the gradual addition of 2 N. sulfuric acid, but care should be taken that weak alkalinity to phenolphthalein is maintained. The stirring is continued for an hour, the mixture being gradually permitted to cool down to room temperature, and the gelatinous precipitate is pressed, washed with 200 parts of water in small portions, dried at about 80° C. and broken into fragments which are then calcined with 4–6% burner gases at 450–500° C., followed by blowing out with air.

Instead of using the iron vanadate as a diluent in the zeolite other catalytically active salts of vanadium or other metal acids of the fifth and sixth groups of the periodic system may be used. Examples of such salts are those of nickel, cobalt, manganese, copper, aluminum, titanium, silver, barium and calcium.

The contact mass, if desired, may be affixed to massive carriers of natural or artificial origin such as materials rich in silica, for example, roughened fragments of quartz, flint, pumice, quartz filter stones or artificial carriers such as, for example, pellets formed from kieselguhr and alkalies or alkali metal salts. Metals or metal alloy granules may hydride by well known means. The reaction may also be carried out in the presence of steam, which exerts a favorable influence.

also be used, such as those of aluminum, ferrovanadium, ferromolybdenum, ferrosilicon, silicon ferromanganese, silicon aluminum ferromanganese, ferrotitanium, ferrotungsten and the like. Preferably the metal granules are provided with roughened or etched surfaces. The coating may be effected by causing the suspension of impregnated infusorial earth and waterglass to adhere to the carriers and then forming the zeolite in situ by adding the aluminate solution, or by spraying with an aluminum sulfate solution, in which case a zeolite of the aluminum double silicate type is formed.

An effective modification consists in leaching the zeolite contact mass in order to remove part or all of the exchangeable alkali. This may be effected by trickling ½ to 1% acid solutions over the base exchange body.

Acenaphthene of various grades of purity vaporized in an air stream in the ratio of 1:20 is passed over the contact mass at 340–410° C., naphthalic anhydride being obtained as the main product.

*Example 25*

20 parts of $V_2O_5$ are intimately mixed with 6.2 parts of silver nitrate and then melted together. The melt is permitting to cool, being transformed into the puffed, porous silver vanadyl vanadate with evolution of oxygen. After cooling it is pulverized, and suspended in 250 parts of water to which 25–35 parts of potassium sulfate are added. The suspension is then sprayed onto 500 volumes of 8–12 mesh pumice fragments as described in the foregoing example and calcined with air at 400° C. 80% acenaphthene uniformly vaporized with air with or without steam in the proportion of 1:30 by weight is passed over the contact mass at 380–400° C., naphthalic anhydride of high purity being obtained as the main product.

Instead of using silver vanadyl vanadate, one or more of the corresponding vanadyl vanadates of sodium, potassium, lithium, rubidium or caesium may be used. Advantageous compositions of the various vanadyl vanadates are as follows:—

$V_2O_5$ to $Na_2O$ as 6:1
$V_2O_5$ to $K_2O$ as 5:1
$V_2O_5$ to $Li_2O$ as 2:1
$V_2O_5$ to $Rb_2O$ as 5:1
$V_2O_5$ to $Cs_2O$ as 5:1

It should be noted that the present invention is applicable to the application of acenaphthene or its halogen derivatives. Any of these materials will be included under the term "acenaphthene substances", which will be used in the claims in this sense and in no other.

What is claimed as new is:

1. A method of oxidizing acenaphthene substances, which comprises vaporizing the substances, admixing the vapors with an oxidizing gas and passing the mixture at reaction temperature over a contact mass containing at least one compound of an element included in the group consisting of alkali metals and alkaline earth metals.

2. A method of oxidizing acenaphthene substances, which comprises vaporizing the substances, admixing the vapors with an oxidizing gas and passing the mixture at reaction temperature over a contact mass containing at least one compound of an element included in the group consisting of alkali metals and alkaline earth metals and at least one catalyst included in the group consisting of hydrogenation catalysts, dehydrogenation catalysts, reduction catalysts, oxidation catalysts which, when used alone, are not specific catalysts for the oxidation of acenaphthene to naphthalic anhydride.

3. A method of oxidizing acenaphthene substances, which comprises vaporizing the substances, admixing the vapors with an oxidizing gas and passing the mixture at reaction temperature over a vanadium containing contact mass having associated therewith at least one compound of an element included in the group consisting of alkali metals and alkaline earth metals.

4. A method of oxidizing acenaphthene substances, which comprises vaporizing the substances, admixing the vapors with an oxidizing gas and passing the mixture at reaction temperature over a vanadium containing contact mass having associated therewith at least one compound of an element included in the group consisting of alkali metals and alkaline earth metals and at least one catalyst included in the group consisting of hydrogenation catalysts, dehydrogenation catalysts, reduction catalysts, oxidation catalysts which, when used alone, are not specific catalysts for the oxidation of acenaphthene to naphthalic anhydride.

5. A method of oxidizing acenaphthene substances, which comprises vaporizing the substances, admixing the vapors with an oxidizing gas and passing the mixture at reaction temperature over a contact mass containing a permutogenetic body.

6. A method of oxidizing acenaphthene substances, which comprises vaporizing the substances, admixing the vapors with an oxidizing gas and passing the mixture at reaction temperature over a contact mass containing a diluted permutogenetic body.

7. A method of oxidizing acenaphthene substances, which comprises vaporizing the substances, admixing the vapors with an oxidizing gas and passing the mixture at reaction temperature over a contact mass containing a permutogenetic body containing a catalyst for the oxidation of acenaphthene substances at least one catalytically active element being present in the permutogenetic body in non-exchangeable form.

8. A method of oxidizing acenaphthene substances, which comprises vaporizing the substances, admixing the vapors with an oxidizing gas and passing the mixture at reaction temperature over a contact mass containing a diluted permutogenetic body containing a catalyst for the oxidation of acenaphthene substances at least one catalytically active element being present in the permutogenetic body in non-exchangeable form.

9. A method of oxidizing acenaphthene substances, which comprises vaporizing the substances, admixing the vapors with an oxidizing gas and passing the mixture at reaction temperature over a vanadium-containing contact mass having associated therewith a permutogenetic body.

10. A method of oxidizing acenaphthene substances, which comprises vaporizing the substances, admixing the vapors with an oxidizing gas and passing the mixture at a reaction temperature over a contact mass containing a permutogenetic body, vanadium being present in the permutogenetic body in non-exchangeable form.

11. A method according to claim 1 in which the reaction takes place in the presence of steam.

12. A method according to claim 2 in which the reaction takes place in the presence of steam.

13. A method according to claim 3 in which the reaction takes place in the presence of steam.

14. A method according to claim 5 in which the reaction takes place in the presence of steam.

15. A method according to claim 7 in which the reaction takes place in the presence of steam.

16. A method according to claim 9 in which the reaction takes place in the presence of steam.

17. A method according to claim 10 in which the reaction takes place in the presence of steam.

18. A method according to claim 6, in which the reaction takes place in the presence of steam.

19. A method of oxidizing acenaphthene substances, which comprises vaporizing the substances, admixing the vapors with an oxidizing gas and steam and passing the mixture at reaction temperature over a contact mass which favors the oxidation of acenaphthene substances, the contact mass containing at least one permutogenetic body in which at least one metal element of the fifth or sixth group of the periodic system is present.

20. A method of oxidizing acenaphthene, which comprises vaporizing the acenaphthene, admixing the vapors with an oxidizing gas and passing the mixture at reaction temperature over a contact mass containing at least one compound of an element included in the group consisting of alkali metals and alkaline earth metals.

21. A method of oxidizing acenaphthene, which comprises vaporizing the acenaphthene, admixing the vapors with an oxidizing gas and passing the mixture at reaction temperature over a contact mass containing a permutogenetic body.

Signed at Pittsburgh, Pennsylvania this 4th day of September, 1928.

ALPHONS O. JAEGER.